US012320319B2

(12) United States Patent
Bouquey et al.

(10) Patent No.: US 12,320,319 B2
(45) Date of Patent: Jun. 3, 2025

(54) METHOD FOR IGNITING A MOTOR VEHICLE COMBUSTION ENGINE

(71) Applicant: VITESCO TECHNOLOGIES GmbH, Regensburg (DE)

(72) Inventors: Christophe Bouquey, Toulouse (FR); Arnaud Chicher, Toulouse (FR)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 0 days.

(21) Appl. No.: 18/580,101

(22) PCT Filed: Aug. 9, 2022

(86) PCT No.: PCT/EP2022/072313
§ 371 (c)(1),
(2) Date: Jan. 17, 2024

(87) PCT Pub. No.: WO2023/025586
PCT Pub. Date: Mar. 2, 2023

(65) Prior Publication Data

US 2025/0003379 A1 Jan. 2, 2025

(30) Foreign Application Priority Data

Aug. 26, 2021 (FR) ....................................... 2108912

(51) Int. Cl.
*F02P 3/05* (2006.01)
*F02P 3/045* (2006.01)

(52) U.S. Cl.
CPC ............. *F02P 3/053* (2013.01); *F02P 3/0456* (2013.01)

(58) Field of Classification Search
CPC ................................ F02P 3/053; F02P 3/0456
(Continued)

(56) References Cited

U.S. PATENT DOCUMENTS 6,283,104 B1 9/2001 Ito et al.
2018/0038335 A1 2/2018 Doi et al.
2020/0095971 A1 3/2020 Tang et al.

FOREIGN PATENT DOCUMENTS

DE 4226248 A1 2/1994
DE 10023835 A1 4/2001
(Continued)

OTHER PUBLICATIONS

JP-2001050147-A (Ito et al.) (Feb. 23, 2001) (Machine Translation) (Year: 2001).*
(Continued)

*Primary Examiner* — Mahmoud Gimie
(74) *Attorney, Agent, or Firm* — NIXON & VANDERHYE

(57) ABSTRACT

A method for igniting a motor vehicle combustion engine is implemented by an electronic control unit of an ignition circuit of a motor vehicle combustion engine, the ignition circuit including a transformer, including a primary coil and a secondary coil, and a spark plug electronically connected to the secondary coil of the transformer, the primary coil being capable of charging, and capable of discharging into the secondary coil, the discharge duration of the primary coil being predefined, the spark plug being capable of generating a spark during the discharging of the primary coil into the secondary coil, the method including: a) a step of requesting to start a combustion cycle of the engine; a first phase referred to as "generating a main spark"; and c) a second phase referred to as "generating at least one subsidiary spark".

6 Claims, 8 Drawing Sheets

(58) Field of Classification Search
USPC .................................................. 123/618, 638
See application file for complete search history.

(56) References Cited

FOREIGN PATENT DOCUMENTS

| | | | | | |
|---|---|---|---|---|---|
| DE | 10003109 | A1 | | 8/2001 | |
| DE | 102014015486 | A1 | * | 3/2015 | .............. F02P 15/08 |
| EP | 2203640 | A1 | | 7/2010 | |
| EP | 2410169 | A1 | | 1/2012 | |
| EP | 2792878 | A1 | | 10/2014 | |
| EP | 2873850 | A1 | | 5/2015 | |
| JP | H02283864 | A | | 11/1990 | |
| JP | 2001050147 | A | * | 2/2001 | .............. F02P 15/08 |
| JP | 2009215902 | A | | 9/2009 | |
| JP | 2009228507 | A | | 10/2009 | |
| JP | 2016084750 | A | | 5/2016 | |
| WO | 2009053162 | A1 | | 4/2009 | |

OTHER PUBLICATIONS

International Search Report and Written Opinion of the ISA for PCT/EP2022/072313 mailed Dec. 14, 2022, 13 pages.

* cited by examiner

METHOD FOR IGNITING A MOTOR VEHICLE COMBUSTION ENGINE

CROSS-REFERENCE TO RELATED APPLICATIONS

This application is the U.S. national phase of International Application No. PCT/EP2022/072313 filed Aug. 9, 2022 which designated the U.S. and claims priority to FR Patent Application No. 2108912 filed Aug. 26, 2021, the entire contents of each of which are hereby incorporated by reference.

TECHNICAL FIELD

The invention relates to the field of hybrid or conventional motor vehicles, and more specifically to igniting a motor vehicle combustion engine.

PRIOR ART

As is known, a motor vehicle combustion engine comprises hollow cylinders each delimiting a combustion chamber into which an air and fuel mixture is injected. This mixture is compressed in the cylinder by a piston and ignited so as to make the piston move in translation inside the cylinder. The movement of the pistons in each cylinder of the engine rotates an engine shaft, called a "crankshaft", making it possible, via a transmission system, to rotate the wheels of the vehicle.

The combustion engine comprises an ignition system, capable of starting the combustion engine. The ignition system comprises an ignition circuit mounted in each cylinder of the combustion engine. Each ignition circuit is capable of generating a spark that will then trigger the combustion of the air and fuel mixture present in the cylinder. It is known practice to generate a series of sparks in order to ignite the combustion engine.

The ignition circuit comprises a spark plug and a current transformer, called an "ignition coil" by a person skilled in the art, comprising a primary coil and a secondary coil.

In order to generate a spark, the primary coil charges, and then discharges into the secondary coil. More specifically, a spark is generated by the spark plug at the moment of the discharge into the secondary coil.

In order to generate a series of sparks, it is therefore necessary to repeat the charge and discharge cycle of the primary coil.

An electronic control unit makes it possible to control the charge and discharge time of the primary coil.

However, when the discharge time is short and does not allow the complete discharging of the primary coil into the secondary coil, the energy transmitted is not the maximum possible and the spark generated is referred to as "incomplete". In addition, on the next cycle, the charge current of the primary coil will not be zero. In order to overcome this drawback, it is known practice to increase the discharge time into the secondary coil in order to ensure the complete discharging of the primary coil into the secondary coil. However, this also has the drawback of generating a delay between the end of the discharge and the start of the charging of the next cycle. It is desirable to generate sparks close together.

EP2203640 discloses an ignition circuit comprising a current transformer referred to as "smart" as it is capable of measuring the current in the primary coil and the current in the secondary coil. During the charging of the primary coil, the transformer is capable of detecting the moment when the current measured in the primary coil has reached a predefined current threshold in order to initiate the discharging of the primary coil into the secondary circuit. Likewise, during the discharge into the secondary coil, the transformer is capable of detecting the moment when the current in the secondary coil has reached a predefined current threshold in order to initiate the charging of the primary coil.

However, incorporating this type of coil into an ignition circuit is complex. In addition, the coil in itself is costly. This therefore increases the overall cost of the ignition circuit. There is therefore a need for a solution that makes it possible to at least partially overcome these drawbacks.

DISCLOSURE OF THE INVENTION

To this end, the invention relates to a method for igniting a motor vehicle combustion engine, said method being implemented by an electronic control unit of an ignition circuit of a motor vehicle combustion engine, said ignition circuit comprising a transformer, comprising a primary coil and a secondary coil, and a spark plug electronically connected to the secondary coil of the transformer, the primary coil being capable of charging, and capable of discharging into the secondary coil, the discharge duration of the primary coil being predefined, the spark plug being capable of generating a spark during the discharging of the primary coil into the secondary coil, the method comprising:

a. a step of requesting to start a combustion cycle of the combustion engine, b. a first phase referred to as "generating a main spark", comprising:

i. a step of activating the charging of the primary coil, ii. a step of continuously measuring the current in the primary coil during the charging of the primary coil, iii. a step of deactivating the charging of the primary circuit and activating the discharging of the primary coil into the secondary coil for the predefined discharge duration when a measured current value received is equal to a predefined reference maximum current value $I_{max}$, c. a second phase referred to as "generating at least one subsidiary spark" after the first phase, comprising:

i. a step of activating the charging of the primary coil for a predefined charging duration, ii. a step of measuring the current referred to as the "repeat current" in the primary coil at the moment of activation of the charging of the primary coil, iii. a step of determining the difference between the repeat current value and a reference repeat current value, 1. if the measured repeat current value is greater than the reference repeat current value, a step of increasing the value of the discharge duration, 2. if the measured repeat current value is less than the reference repeat current value, a step of decreasing the value of the discharge duration, iv. a step of continuously measuring the current in the primary coil during the charging of the primary coil, v. when the measured current value is equal to a predefined reference maximum current value:

1. a step of deactivating the charging of the primary coil and activating the discharging of the primary coil into the secondary coil for the increased or decreased discharge duration, 2. or a step of deactivating the charging of the primary coil and activating the discharge into the secondary coil for the predefined discharge duration, a second request to start a combustion cycle of the combustion engine, a second first phase, and a second second phase in which the discharge into the secondary coil takes place for the increased or decreased discharge duration.

The method thus makes it possible to adjust the discharge duration of the primary coil into the secondary coil in order to regulate the value of the repeat current in the primary coil. The energy transmitted by the secondary coil to the air and fuel mixture is not systematically linear. This makes it possible to optimize the energy supplied by each spark generated during the discharge duration.

A combustion cycle of the combustion engine comprises a phase of intake of air and fuel into a cylinder of the vehicle, a phase of compression of the air and fuel mixture in the cylinder, a phase of combustion of the air and fuel mixture due to the compression of said mixture and expansion, and a phase of exhausting of the gases emitted during combustion.

The invention also relates to a computer program product, characterized in that it comprises a set of program code instructions, which, when they are executed by one or more processors, configure the one or more processors to implement a method as described above.

The invention further relates to an electronic control unit for controlling a ignition circuit of a motor vehicle combustion engine, said ignition circuit comprising a transformer, comprising a primary coil and a secondary coil, and a spark plug electronically connected to the secondary coil of the transformer, the primary coil being capable of charging, and capable of discharging into the secondary coil, the discharge duration of the primary coil being predefined, the electronic control unit being capable of controlling the activation and deactivation of the charging of the primary coil and the activation of the discharging of the primary coil into the secondary coil, and of receiving the value of the current in the primary coil, the electronic control unit being characterized in that it is configured to implement the method as described above.

Preferably, the primary coil is connected to a supply terminal capable of supplying an electrical voltage, the electronic control unit comprising a switch electrically connected between the primary coil and a ground and being capable of connecting or disconnecting the primary coil to or from the ground, the electronic control unit being configured to control the closing of the switch in order to activate the charging of the primary coil, and to control the opening of the switch in order to deactivate the charging of the primary coil and activate the discharging of the primary coil into the secondary coil.

The invention also relates to a motor vehicle comprising a combustion engine and at least one ignition circuit mounted in said engine, said ignition circuit comprising a transformer, comprising a primary coil and a secondary coil, and a spark plug electronically connected to the secondary coil of the transformer, the primary coil being capable of charging, and capable of discharging into the secondary coil, the discharge duration of the primary coil being predefined, the vehicle being characterized in that it comprises an electronic control unit as set out above.

DESCRIPTION OF THE DRAWINGS

Further features and advantages of the invention will become more clearly apparent upon reading the following description. This description is purely illustrative and should be read with reference to the appended drawings, in which.

DESCRIPTION OF THE EMBODIMENTS

Vehicle

Figure 1:
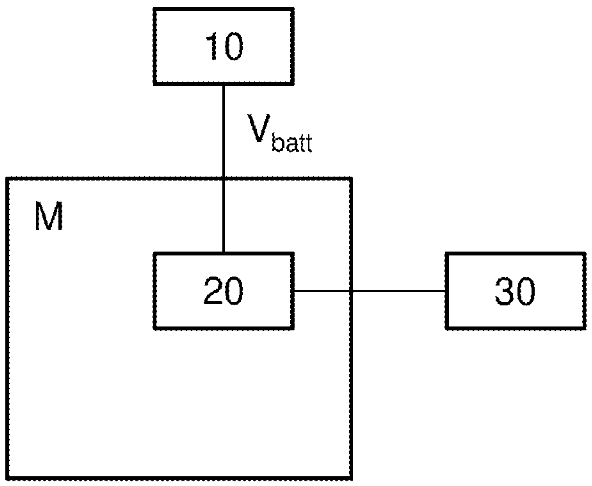
FIG. 1 is a schematic view of a combustion engine, an ignition system and an electronic control unit according to the invention.

With reference to FIG. 1, an embodiment of the vehicle according to the invention will now be described. The vehicle is a hybrid or conventional vehicle and therefore comprises a combustion engine M. As is known, the combustion engine M comprises a plurality of cylinders, each delimiting a combustion chamber in which a piston slides, the movement of which piston is driven by compression and expansion of the gases resulting from the compression of an air and fuel mixture introduced into the combustion chambers.

A combustion cycle of the combustion engine comprises a phase of intake of air and fuel into a cylinder of the vehicle, a phase of compression of the air and fuel mixture in the cylinder, a phase of combustion of the air and fuel mixture due to the compression of said mixture and expansion, and finally a phase of exhausting of the gases emitted during combustion.

The vehicle comprises a battery 10, a system 20 for igniting the combustion engine M, and an electronic control unit 30.

Battery 10

The battery 10 comprises a supply terminal via which the battery 10 is capable of supplying an electrical voltage $V_{batt}$. The battery 10 is thus connected to various elements of the vehicle and is capable of powering said equipment.

Ignition System 20

The ignition system 20 is capable of starting the engine. The ignition system 20 is also electronically connected to the battery 10 in order to be supplied with electrical energy by the battery 10.

The ignition system 20 comprises a plurality of ignition circuits. Each ignition circuit $C_{20}$ (FIG. 2) is assigned to a cylinder of the combustion engine M.

Each ignition circuit $C_{20}$ is capable of generating at least one spark that will then trigger the combustion of the air and fuel mixture present in the cylinder. More specifically, a series of sparks must be generated in order to start the combustion engine M.

Figure 2:
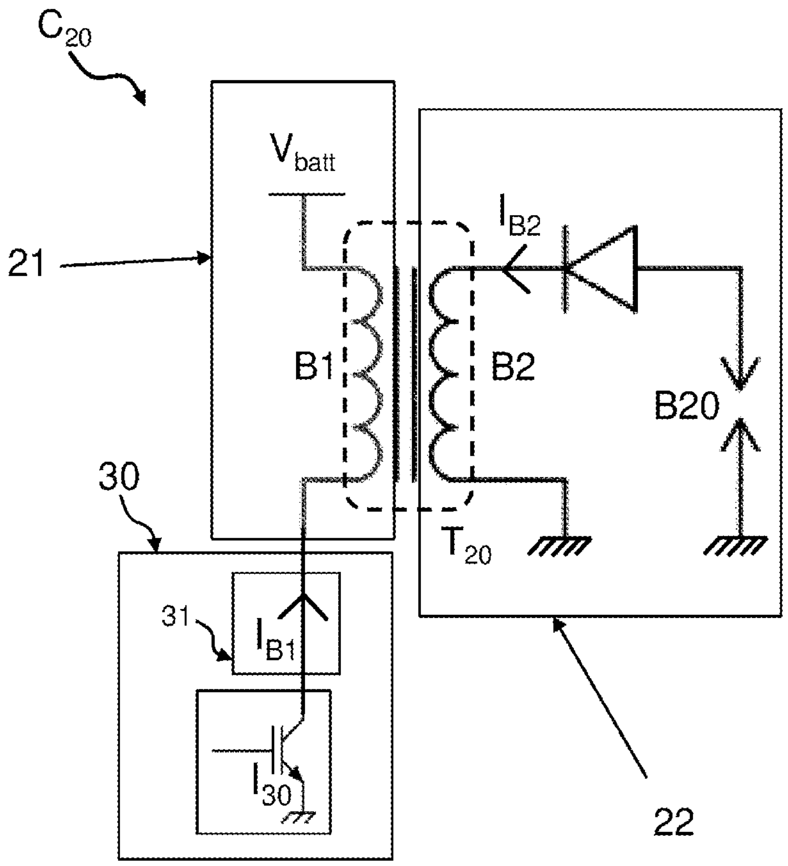
FIG. 2 schematically shows an ignition circuit of the ignition system according to the invention.

With reference to FIG. 2, each ignition circuit $C_{20}$ comprises a transformer $T_{20}$ and a spark plug B20. The transformer $T_{20}$ comprises a primary coil B1 and a secondary coil B2.

The transformer $T_{20}$ is also referred to as the "ignition coil" by a person skilled in the art.

A first end of the primary coil B1 is connected to the battery 10. In other words, the primary coil B1 is supplied with electrical energy by the electrical voltage $V_{batt}$ supplied by the battery 10. The current passing through the primary coil B1 is referred to as the "current $I_{B1}$".

The secondary coil B2 is electrically connected to the ground and to the spark plug B20. The current passing through the secondary coil B2 is referred to as the "current $I_{B2}$".

The assembly comprising the primary coil B1 is referred to as the "primary circuit 21", and the assembly comprising the secondary coil B2 and the spark plug B20 is referred to as the "secondary circuit 22".

In order to generate a spark, the primary coil B1 charges, and then discharges into the secondary coil B2. More specifically, a spark is generated by the spark plug B20 at the moment of the discharge into the secondary coil B2.

In order to generate a series of sparks, it is therefore necessary to carry out the charging and discharging of the primary circuit 21 several times.

Electronic Control Unit 30

With reference to FIGS. 1 and 2, the electronic control unit 30 comprises a switch 130. The switch 130 is connected between the ground and the second end of the primary coil B1. More specifically, the switch $I_{30}$ is a transistor, and in particular a bipolar transistor.

When the switch $I_{30}$ is closed, the primary coil B1 charges. Conversely, when the switch $I_{30}$ is open, the primary coil B1 discharges into the secondary coil B2.

The electronic control unit 30 is capable of controlling the opening and closing of the switch $I_{30}$.

In addition, the electronic control unit 30 comprises a current measuring device 31 connected between the switch $I_{30}$ and the primary coil B1 and is capable of measuring the current in the primary coil B1. The electronic control unit 30 therefore has access to each current value measured by the current measuring device 31.

The electronic control module 30 comprises a processor capable of implementing a set of instructions making it possible to carry out these functions.

Method

With reference to FIGS. 3 to 9, two embodiments of the method for igniting a combustion engine M according to the invention will now be described.

Step E0 of Requesting to Start a Combustion Cycle

The method comprises a step E0 of starting a combustion cycle of the combustion engine M. For example, this corresponds to the moment when the driver of the vehicle turns the ignition key in the ignition of the dashboard of the vehicle, or when the driver presses on the start button mounted on the dashboard of the vehicle.

First Phase P1 of Generating a Main Spark

Figure 3:
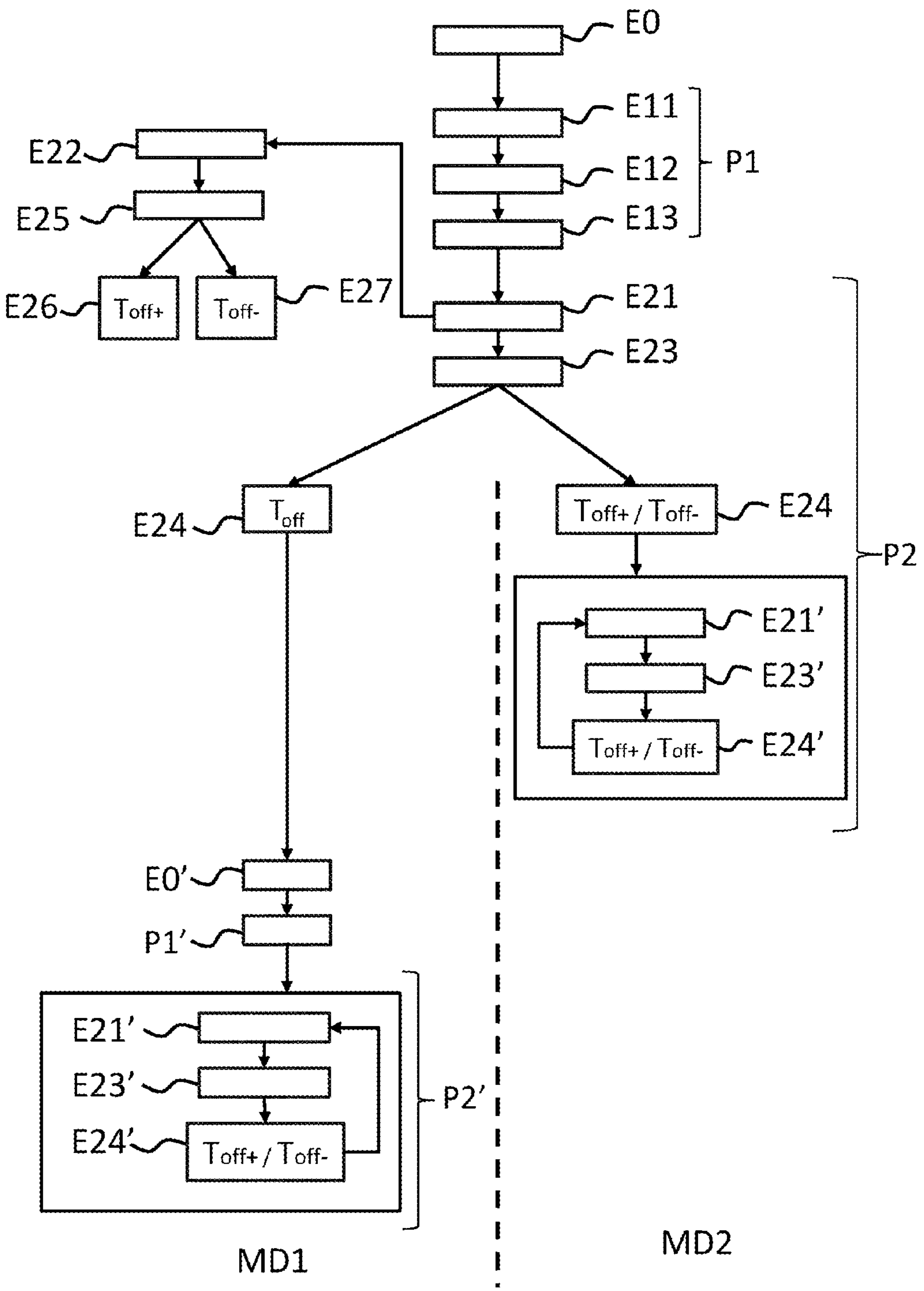
FIG. 3 illustrates the method according to the invention.
Figure 4:
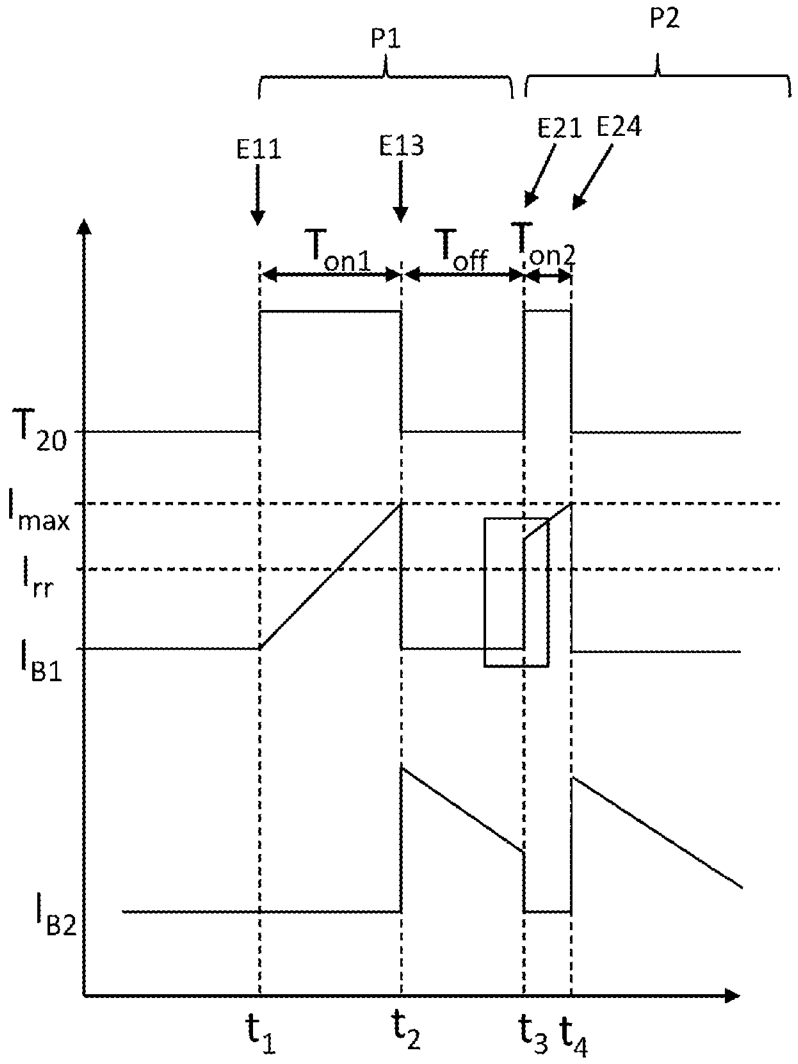
FIG. 4 is a graph showing the opening and closing of the switch of an ignition circuit, the variation of the current in the primary coil of the ignition circuit and the variation of the current in the secondary coil of the ignition circuit as a function of time when the value of the repeat current in the primary coil is greater than the value of the reference repeat current.

With reference to FIGS. 3 and 4, following the step E0 of requesting to start a combustion cycle, the method comprises a first phase P1 of generating a main spark. The first phase P1 comprises a step E11 of activating the charging of the primary circuit 21 at a first time t1. In other words, at the first time t1, the electronic control unit 30 controls the closing of the switch $I_{30}$. The primary coil B1 of the primary circuit 21 thus charges from the first time t1 and the current $I_{B1}$ in the primary coil B1 increases.

The activation of the charging of the primary circuit 21 is therefore equivalent to the activation of the charging of the primary coil B1.

The first phase P1 then comprises a step E12 of continuously measuring the current $I_{B1}$ in the primary coil B1 during the charging of the primary circuit 21, by means of the current measuring device 31. "Continuously" is given to mean that the current $I_{B1}$ is measured at regular time intervals, for example every 20 μs. Each current value $I_{B1}$ measured is accessible by the electronic control unit 30.

The first phase P1 then comprises a step E13 of deactivating the charging of the primary circuit 21 when a measured current value received is equal to a predefined reference maximum current value $I_{max}$. In other words, the electronic control unit 30 compares each current value received to the predefined reference maximum current value $I_{max}$. When the value of the current $I_{B1}$ is equal to the predefined reference maximum current value $I_{max}$, this means that the charge of the primary coil B1 is sufficient and the electronic control unit 30 controls the opening of the switch 130.

In other words, the opening of the switch $I_{30}$ makes it possible to deactivate the charging of the primary circuit 21 and therefore to activate the discharging of the primary coil B1 into the secondary coil B2.

The time of opening of the switch $I_{30}$ is defined by a second time t2. The charging time of the primary coil B1 is thus defined by the duration "$T_{on1}$", corresponding to the closing time of the switch $I_{30}$, between the first time t1 and the second time t2.

The charging of the primary circuit 21 is deactivated, which means that the discharging of the primary circuit 21 into the secondary circuit 22 starts. The primary coil B1 thus discharges into the secondary coil B2 from the second time t2 and for a predefined discharge duration $T_{off}$. In other words, a spark is generated by the spark plug B20 during the discharge duration $T_{off}$.

Second Phase P2 of Obtaining at Least One Subsidiary Spark

Still with reference to FIGS. 3 and 4, following the first phase P1, the method comprises a second phase P2 of obtaining at least one subsidiary spark. The second phase P2 firstly comprises a step E21 of activating the charging of the primary circuit 21 at a third time t3, defined when the predefined discharge duration $T_{off}$ has elapsed after the step E13 of deactivating the charging of the primary circuit 21 at the second time t2. In other words, at the third time t3, the electronic control unit 30 controls the closing of the switch $T_{20}$. The primary coil B1 of the primary circuit 21 thus charges from the third time t3 and the current $I_{B1}$ in the primary coil B1 increases.

At the moment of the activation of the charging of the primary circuit 21, in other words at the third time t3 when the switch $I_{30}$ is closed, the second phase P2 comprises a step E22 of measuring the current $I_{B1}$ in the primary coil B1 by means of the current measuring device 31. The current value $I_{B1}$ measured is referred to as the "repeat" current, as it corresponds to the value of the current at the moment of the activation of the charging of the primary circuit 21.

The second phase P2 then comprises a step E23 of continuously measuring the current in the primary coil B1 during the charging of the primary circuit 21 by means of the current measuring device 31. "Continuously" is given to mean that the current is measured at regular time intervals, for example every 20 μs. Each current value $I_{B1}$ measured is sent to the electronic control unit 30 by the measuring device 31.

The second phase P2 then comprises a step E24 of deactivating the charging of the primary circuit 21 when a measured current value received is equal to the predefined reference maximum current value $I_{max}$. In other words, the electronic control unit 30 compares each current value $I_{B1}$ received to the predefined reference maximum current value $I_{max}$. When the current value $I_{B1}$ is equal to the predefined reference maximum current value $I_{max}$, this means that the charge of the primary coil B1 is sufficient and the electronic control unit 30 controls the opening of the switch $I_{30}$.

Still with reference to FIG. 4, the time of opening of the switch $I_{30}$ is defined by a fourth time t4. The charging time of the primary coil B1 is thus defined by the duration "$T_{on2}$", corresponding to the closing time of the switch $I_{30}$, between the third time t3 and the fourth time t4.

The charging of the primary circuit 21 is deactivated, which means that the discharging of the primary circuit 21 into the secondary circuit 22 starts. The primary coil B1 thus discharges into the secondary coil B2 from the fourth time t4. This is when a spark is generated by the spark plug B20.

The second phase P2 comprises, after the receipt of the measured repeat current value by the electronic control unit 30 and before the step E24 of deactivating the charging of the primary circuit 21, a step E25 of determining the difference between the repeat current value received and a reference repeat current value $I_{rr}$.

In addition, with reference to FIG. 4, if the measured repeat current value is greater than the reference repeat current value $I_{rr}$, the second phase P2 comprises a step E26 of increasing the value of the predefined discharge duration $T_{off}$.

The electronic control unit 30 knows the impact of the variation of the discharge duration on the repeat current value and is therefore capable of determining the necessary increase in the value of the discharge duration in order to obtain a lower repeat current value than the preceding measured repeat current value.

First Embodiment

Figure 5:
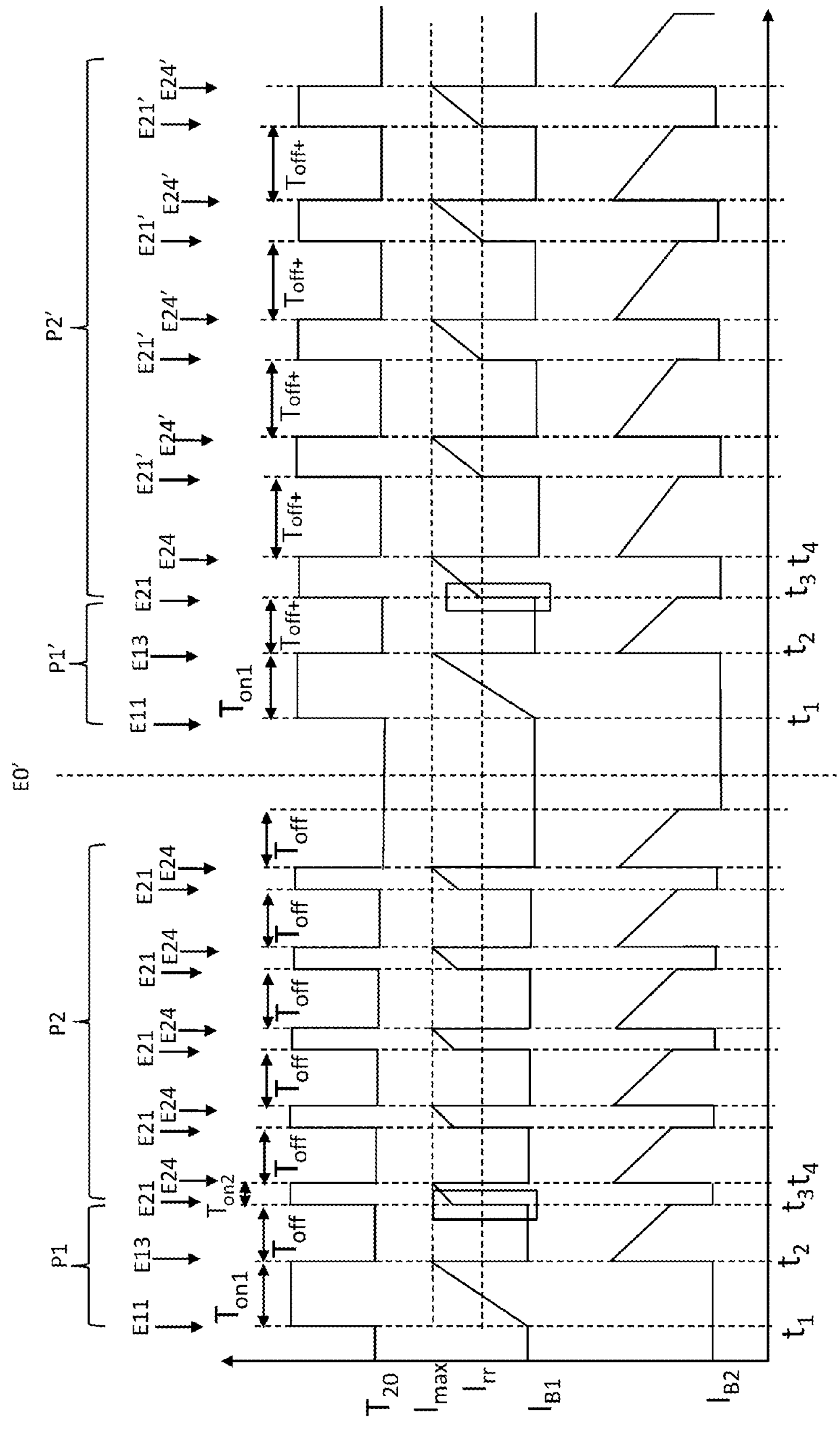
FIG. 5 graphically illustrates the opening and closing of the switch of an ignition circuit, the variation of the current in the primary coil of the ignition circuit and the variation of the current in the secondary coil of the ignition circuit as a function of time according to the first embodiment of the method according to the invention when the value of the repeat current in the primary coil is greater than the value of the reference repeat current.

With reference to FIGS. 3 and 5, according to a first embodiment MD1, the second phase P2 repeats all of the following steps a predetermined number of times:

a. the step E21 of activating the charging of the primary circuit 21,
b. followed by the step E23 of continuously measuring the current $I_{B1}$ in the primary coil B1 by means of the current measuring device 31,
c. and followed by the step E24 of deactivating the charging of the primary circuit 21.

After each step E24 of deactivating the charging of the primary circuit 21, the spark plug B20 generates a spark.

The preceding steps are reiterated a predefined number of times, corresponding to the number of sparks necessary to ignite the air and fuel mixture injected into the cylinder associated with the ignition circuit $C_{20}$ comprising the spark plug B20. A series of sparks is thus generated in order to make it possible to start a combustion cycle of the combustion engine M.

According to the first embodiment of the method, when a request E0' to start a combustion cycle of the combustion engine M is made a second time, the method comprises a second first phase P1' and a second second phase P2'. The second second phase P2' also comprises the following sequence of steps at least once: the step E21' of activating charging, the step E23' of continuously measuring the current, and the step E24' of deactivating charging, as described above, with the difference that the discharge duration corresponds to the increased discharge duration $T_{off+}$.

The repeat current value during the second second phase P2' of the method following the second request E0' to start a combustion cycle of the combustion engine M is thus less than the repeat current value of the first iteration of the second phase P2 of the method.

Second Embodiment

Figure 6:
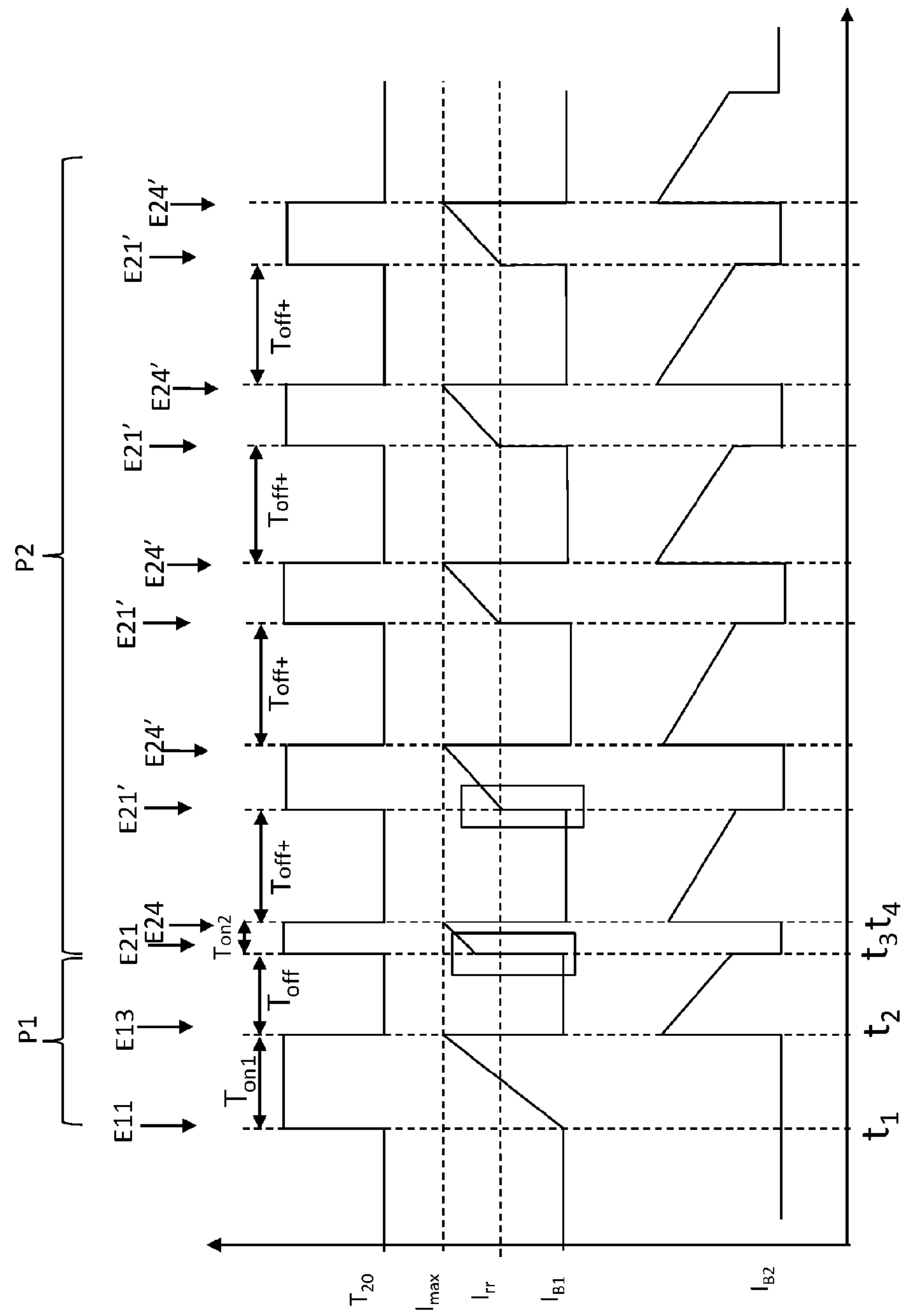
FIG. 6 graphically illustrates the opening and closing of the switch of an ignition circuit, the variation of the current in the primary coil of the ignition circuit and the variation of the current in the secondary coil of the ignition circuit as a function of time according to the second embodiment of the method according to the invention when the value of the repeat current in the primary coil is greater than the value of the reference repeat current.

With reference to FIGS. 3 and 6, according to a second embodiment MD2, the second phase P2 repeats all of the following steps a number of times:

a. the step E21' of activating the charging of the primary circuit 21, at a defined time after the increased discharge duration $T_{off+}$ after the fourth time t4,
b. followed by the step E23' of continuously measuring the current $I_{B1}$ in the primary coil B1 by means of the current measuring device 31,
c. and followed by the step E24' of deactivating the charging of the primary circuit 21.

After each step E24 of deactivating the charging of the primary circuit 21, the spark plug B20 generates a spark. In addition, the step E21' of activating charging is reiterated after the increased charging duration $T_{off+}$.

The preceding steps are reiterated a predefined number of times, corresponding to the number of sparks necessary to ignite the air and fuel mixture injected into the cylinder associated with the ignition circuit $C_{20}$ comprising the spark plug B20.

Figure 7:
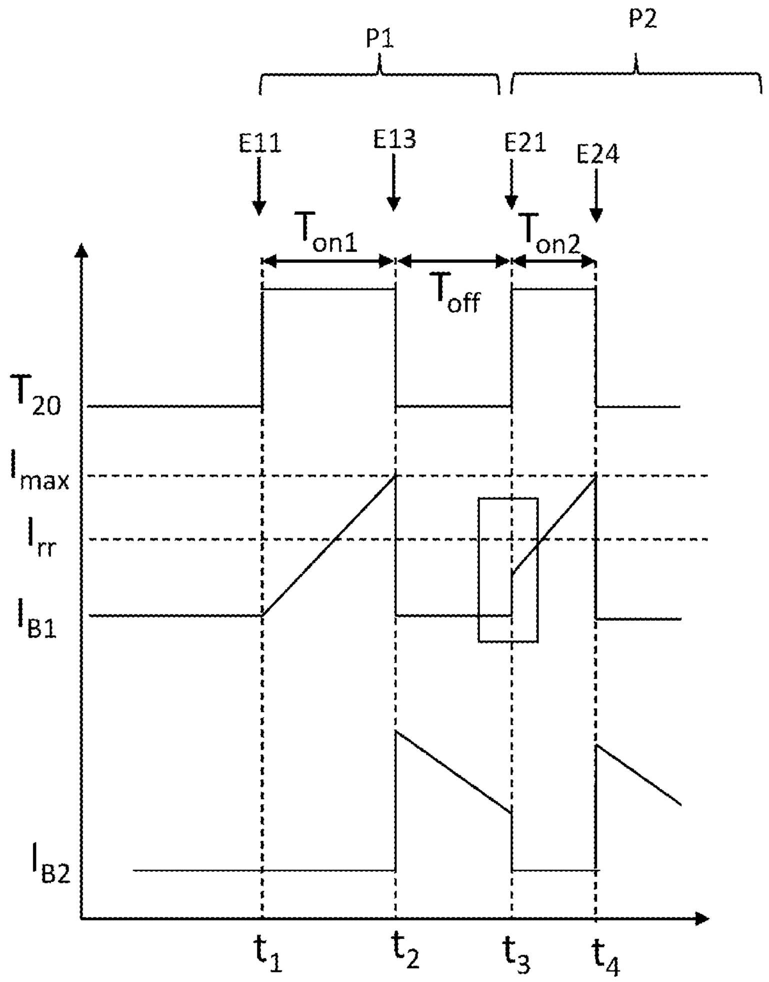
FIG. 7 is a graph showing the opening and closing of the switch of an ignition circuit, the variation of the current in the primary coil of the ignition circuit and the variation of the current in the secondary coil of the ignition circuit as a function of time when the value of the repeat current in the primary coil is less than the value of the reference repeat current.

In another scenario, with reference to FIG. 7, if the measured repeat current value is less than the reference repeat current value $I_{rr}$, the second phase P2 comprises a step E27 of decreasing the value of the predefined discharge duration $T_{off}$.

The electronic control unit 30 knows the impact of the variation of the discharge duration on the repeat current value and is therefore capable of determining the necessary decrease in the value of the discharge duration in order to obtain a repeat current value greater than the measured repeat current value.

First Embodiment

Figure 8:
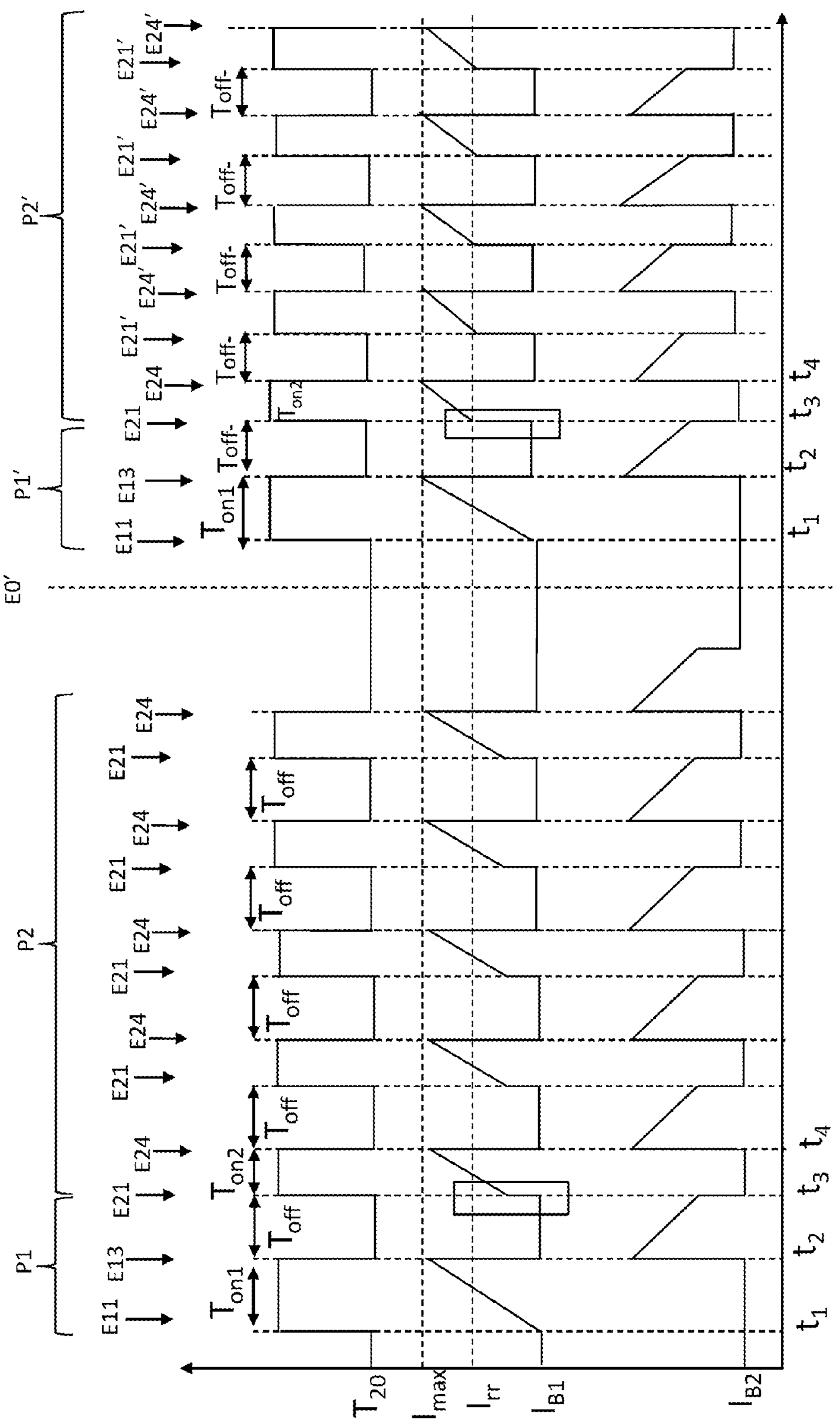
FIG. 8 graphically illustrates the opening and closing of the switch of an ignition circuit, the variation of the current in the primary coil of the ignition circuit and the variation of the current in the secondary coil of the ignition circuit as a function of time according to the first embodiment of the method according to the invention when the value of the repeat current in the primary coil is less than the value of the reference repeat current.

With reference to FIGS. 3 and 8, according to the first embodiment MD1 of the method, the second phase P2 repeats all of the following steps a predetermined number of times:

a. the step E21 of activating the charging of the primary circuit 21, b. followed by the step E23 of continuously measuring the current in the primary coil B1 by means of the current measuring device, c. and followed by the step E24 of deactivating the charging of the primary circuit 21.

After each step E24 of deactivating the charging of the primary circuit 21, the spark plug B20 generates a spark.

The preceding steps are reiterated a predefined number of times, corresponding to the number of sparks necessary to ignite the air and fuel mixture injected into the cylinder associated with the ignition circuit $C_{20}$ comprising the spark plug B20. A series of sparks is thus generated in order to make it possible to start the combustion cycle of the combustion engine M.

According to the first embodiment of the method, when a request E0' to start the combustion cycle of the combustion engine M is made a second time, the method comprises a second first phase P1' and a second second phase P2'. The second second phase P2' also comprises the following sequence of steps at least once: the step E21' of activating charging, the step E23' of continuously measuring the current, and the step E24' of deactivating charging, as described above, with the difference that the discharge duration corresponds to the decreased discharge duration $T_{off-}$.

The repeat current value during the second phase P2 of the method following the second request to start the combustion cycle of the engine M is thus greater than the repeat current value of the first iteration of the second phase P2 of the method.

Second Embodiment

Figure 9:
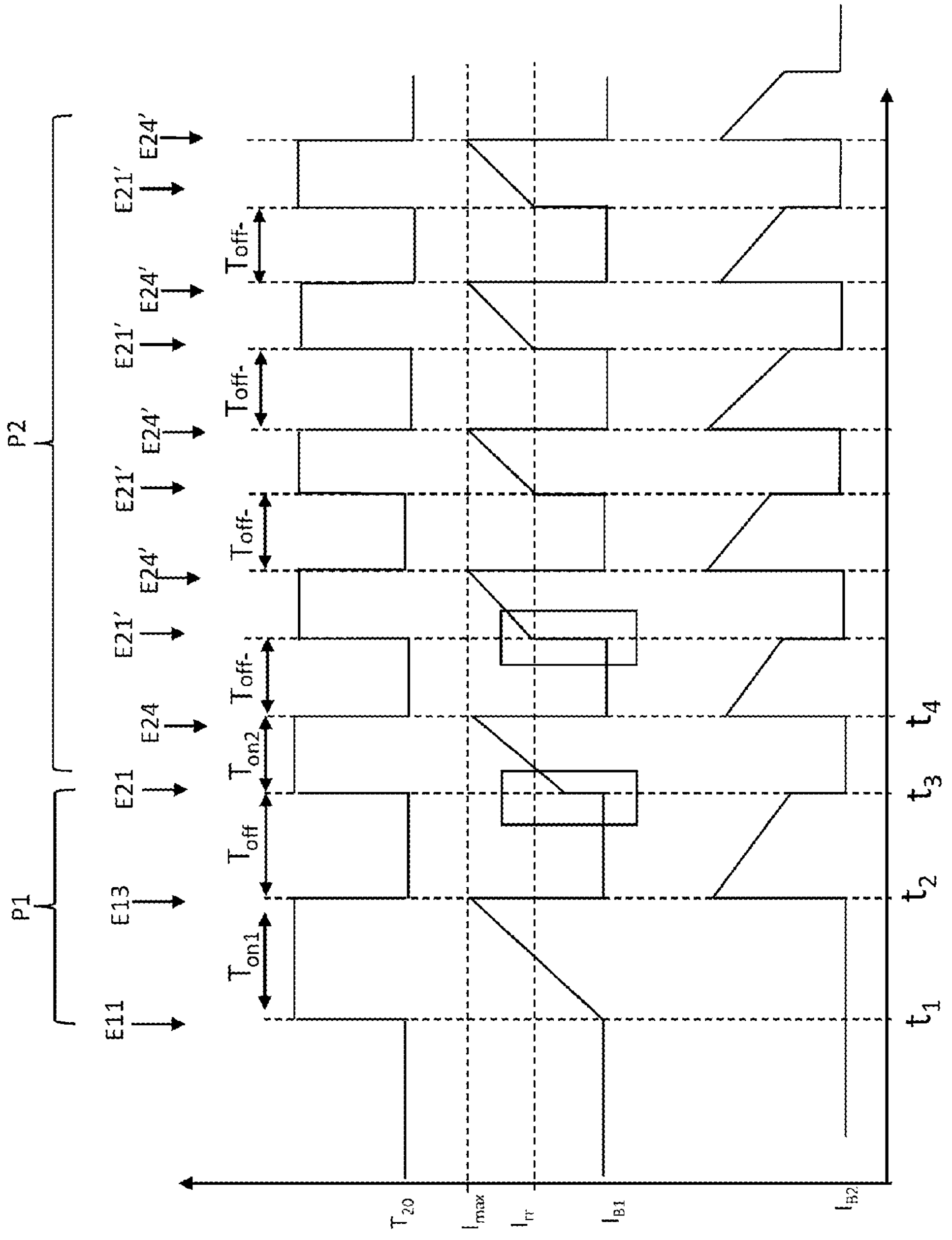
FIG. 9 graphically illustrates the opening and closing of the switch of an ignition circuit, the variation of the current in the primary coil of the ignition circuit and the variation of the current in the secondary coil of the ignition circuit as a function of time according to the second embodiment of the method according to the invention when the value of the repeat current in the primary coil is less than the value of the reference repeat current.

With reference to FIGS. 3 and 9, according to a second embodiment MD2, the second phase P2 repeats all of the following steps a predetermined number of times:

a. the step E21' of activating the charging of the primary circuit 21, at a defined time after the decreased discharge duration $T_{off-}$ after the fourth time $t_4$, b. followed by the step E23' of continuously measuring the current $I_{B1}$ in the primary coil B1 by means of the current measuring device 31, c. and followed by the step E24' of deactivating the charging of the primary circuit 21.

After each step E24' of deactivating the charging of the primary circuit 21, the spark plug B20 generates a spark. In addition, the step E21' of activating charging is reiterated after the decreased charging duration $T_{off-}$.

The preceding steps are reiterated a predefined number of times, corresponding to the number of sparks necessary to ignite the combustion engine M.

The first embodiment MD1 of the method thus uses the value of the increased $T_{off+}$ or decreased $T_{off-}$ charging duration in the second second phase P2' only, whereas the second embodiment MD2 of the method implements the second phase P2 with the increased $T_{off+}$ or decreased $T_{off-}$ charging duration.

The invention claimed is:

1. A method for igniting a motor vehicle combustion engine, said method being implemented by an electronic control unit of an ignition circuit of a motor vehicle combustion engine, said ignition circuit including a transformer including a primary coil, a secondary coil, and a spark plug electronically connected to the secondary coil of the transformer, the primary coil being configured to charge and discharge into the secondary coil, a discharge duration of the primary coil being predefined, the spark plug capable of being configured to generate a spark during the discharge of the primary coil into the secondary coil, the method comprising:

requesting to start a combustion cycle of the combustion engine;

generating a main spark in a first phase after requesting to start the combustion cycle, the generating the main spark comprising:

activating charging of the primary coil, continuously measuring the current in the primary coil during the charging of the primary coil, and deactivating the charging of the primary coil and activating the discharging of the primary coil into the secondary coil for the predefined discharge duration when a measured current value that is received is equal to a predefined reference maximum current value; and generating at least one subsidiary spark in a second phase after the first phase, the second phase comprising:

activating the charging of the primary coil for a predefined charging duration, measuring a repeat current in the primary coil at the moment of activating the charging of the primary coil in the second phase, determining the difference between the repeat current value and a reference repeat current value, then increasing the value of the discharge duration, in a case in which the measured repeat current value is greater than the reference repeat current value, and decreasing the value of the discharge duration, in a case in which the measured repeat current value is less than the reference repeat current value, continuously measuring the current in the primary coil during the charging of the primary coil, and when the measured current value measured during the charging of the primary coil is equal to a predefined reference maximum current value, one of:

deactivating the charging of the primary coil and activating the discharge into the secondary coil for the increased discharge duration or the decreased discharge duration, and deactivating the charging of the primary coil and activating the discharging of the primary coil into the secondary coil for the predefined discharge duration, and requesting to start another combustion cycle of the combustion engine, a second first phase, and a second second phase in which the activation of the discharge into the secondary coil takes place for the increased discharge duration or the decreased discharge duration.

2. A non-transitory computer-readable medium on which is stored a set of program code instructions, which, when executed by one or more processors, configure the one or more processors to implement a method for igniting a motor vehicle combustion engine, said method being implemented by an electronic control unit of an ignition circuit of a motor vehicle combustion engine, said ignition circuit including a transformer including a primary coil, a secondary coil, and a spark plug electronically connected to the secondary coil of the transformer, the primary coil being configured to charge and discharge into the secondary coil, a discharge duration of the primary coil being predefined, the spark plug being configured to generate a spark during the discharge of the primary coil into the secondary coil, the method comprising:

requesting to start a combustion cycle of the combustion engine;

generating a main spark in a first phase comprising:

activating charging of the primary coil, continuously measuring the current in the primary coil during the charging of the primary coil, and deactivating the charging of the primary coil and activating the discharging of the primary coil into the secondary coil for the predefined discharge duration when a measured current value that is received is equal to a predefined reference maximum current value; and generating at least one subsidiary spark in a second phase after the first phase, the second phase comprising:

activating the charging of the primary coil for a predefined charging duration, measuring a repeat current in the primary coil at the moment of activating the charging of the primary coil in the second phase, and determining the difference between the repeat current value and a reference repeat current value, then increasing the value of the discharge duration, in a case in which the measured repeat current value is greater than the reference repeat current value, and decreasing the value of the discharge duration, in a case in which the measured repeat current value is less than the reference repeat current value, continuously measuring the current in the primary coil during the charging of the primary coil, and when the measured current value measured during the charging of the primary coil is equal to a predefined reference maximum current value, one of:

deactivating the charging of the primary coil and activating the discharge into the secondary coil for the increased discharge duration or the decreased discharge duration, and deactivating the charging of the primary coil and activating the discharging of the primary coil into the secondary coil for the predefined discharge duration, and requesting to start another combustion cycle of the combustion engine, a second first phase, and a second second phase in which the activation of the discharge into the secondary coil takes place for the increased discharge duration or the decreased discharge duration.

3. An electronic control unit comprising:

one or more processors configured to control an ignition circuit of a motor vehicle combustion engine, said ignition circuit comprising a transformer comprising a primary coil and a secondary coil, and a spark plug electronically connected to the secondary coil of the transformer, the primary coil being configured to charge, and configured to discharge into the secondary coil, a discharge duration of the primary coil being predefined, the one or more processors being configured to control the activation and deactivation of the charging of the primary coil and the activation of the discharging of the primary coil into the secondary coil, and configured to receive the value of the current in the primary coil, the one or more processors being configured to request to start a combustion cycle of the combustion engine, generate a main spark in a first phase comprising:

activating charging of the primary coil, continuously measuring the current in the primary coil during the charging of the primary coil, and deactivating the charging of the primary coil and activating the discharging of the primary coil into the secondary coil for the predefined discharge duration when a measured current value that is received is equal to a predefined reference maximum current value, and generate at least one subsidiary spark in a second phase after the first phase, the second phase comprising:

activating the charging of the primary coil for a predefined charging duration, measuring a repeat current in the primary coil at the moment of activating the charging of the primary coil in the second phase, and determining the difference between the repeat current value and a reference repeat current value, then increasing the value of the discharge duration, in a case in which the measured repeat current value is greater than the reference repeat current value, and decreasing the value of the discharge duration, in a case in which the measured repeat current value is less than the reference repeat current value, continuously measuring the current in the primary coil during the charging of the primary coil, and when the measured current value measured during the charging of the primary coil is equal to a predefined reference maximum current value, one of:

deactivating the charging of the primary coil and activating the discharge into the secondary coil for the increased discharge duration or the decreased discharge duration, and deactivating the charging of the primary coil and activating the discharging of the primary coil into the secondary coil for the predefined discharge duration, and requesting to start another combustion cycle of the combustion engine, a second first phase, and a second second phase in which the activation of the discharge into the secondary coil takes place for the increased discharge duration or the decreased discharge duration.

4. The electronic control unit as claimed in claim 3, wherein the primary coil is connected to a supply terminal configured to supply an electrical voltage, the electronic control unit comprising a switch electrically connected between the primary coil and a ground and being configured to connect or disconnect the primary coil to or from the ground, the electronic control unit being configured to control the closing of the switch in order to activate charging of the primary coil, and to control the opening of the switch in order to deactivate the charging of the primary coil and activate the discharging of the primary coil into the secondary coil.

5. A motor vehicle comprising:

the electronic control unit as claimed in claim 3;

a combustion engine; and the ignition circuit mounted in said combustion engine, said ignition circuit comprising the transformer comprising the primary coil and the secondary coil, and the spark plug electronically connected to the secondary coil of the transformer, the primary coil being configured to charge and configured to discharge into the secondary coil, the discharge duration of the primary coil being predefined.

6. A motor vehicle comprising:

the electronic control unit as claimed in claim 4;

a combustion engine; and the ignition circuit mounted in said combustion engine, said ignition circuit comprising the transformer comprising the primary coil and the secondary coil, and the spark plug electronically connected to the secondary coil of the transformer, the primary coil being configured to charge and configured to discharge into the secondary coil, the discharge duration of the primary coil being predefined.

* * * * *